(12) United States Patent
Baba (10) Patent No.: US 10,380,893 B2
(45) Date of Patent: Aug. 13, 2019

(54) OBJECT DETECTION APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 118 days.

(21) Appl. No.: 15/513,532

(22) PCT Filed: Sep. 14, 2015

(86) PCT No.: PCT/JP2015/075992
§ 371 (c)(1),
(2) Date: Mar. 22, 2017

(87) PCT Pub. No.: WO2016/047482
PCT Pub. Date: Mar. 31, 2016

(65) Prior Publication Data
US 2017/0294123 A1   Oct. 12, 2017

(30) Foreign Application Priority Data

Sep. 24, 2014   (JP) ................................. 2014-193890

(51) Int. Cl.
*G08G 1/16* (2006.01)
*G01S 15/42* (2006.01)
(Continued)

(52) U.S. Cl.
CPC .............. *G08G 1/16* (2013.01); *B60R 21/00* (2013.01); *G01S 13/42* (2013.01); *G01S 13/867* (2013.01);
(Continued)

(58) Field of Classification Search
CPC ..... G01S 13/867; G01S 13/931; G08G 1/166; G06K 9/00805
See application file for complete search history.

(56) References Cited

U.S. PATENT DOCUMENTS 9,582,886 B2 *   2/2017   Sasabuchi .......... G06K 9/00805
2014/0139369 A1   5/2014   Baba

FOREIGN PATENT DOCUMENTS

JP   2014-122873 A   7/2014
JP   2014-137288 A   7/2014

OTHER PUBLICATIONS

Wu et al., "Collision Sensing by Stereo Vision and Radar Sensor Fusion", IEEE Intelligent Vehicles Symposium, Jun. 2008, pp. 404-409. (Year: 2008).*

(Continued)

*Primary Examiner* — Todd M Melton
(74) *Attorney, Agent, or Firm* — Knobbe, Martens, Olson & Bear, LLP (57) ABSTRACT

In an object detection apparatus, a sameness determination unit determines whether or not a first object and a second object are a same object, where the first object is an object detected by an electromagnetic wave sensor and the second object is an object detected by an image sensor. A position determination unit determines a position of the same object that is an object for which the first object and the second object are determined to be the same, where a Y-coordinate of or a distance to the same object in an XY-plane is determined employing a result of the detection of the first object and an X-coordinate or an azimuth of the same object with respect to a reference direction in the XY-plane is determined employing a result of the detection of the second object.

6 Claims, 7 Drawing Sheets

NORMAL CASE (51) Int. Cl.
*G05D 1/02* (2006.01)
*B60R 21/00* (2006.01)
*G01S 13/42* (2006.01)
*G01S 13/86* (2006.01)
*G01S 13/93* (2006.01)
*G06K 9/00* (2006.01)

(52) U.S. Cl.
CPC ............ *G01S 13/931* (2013.01); *G01S 15/42* (2013.01); *G05D 1/0238* (2013.01); *G05D 1/0255* (2013.01); *G08G 1/163* (2013.01); *G01S 2013/935* (2013.01); *G01S 2013/9346* (2013.01); *G06K 9/00805* (2013.01); *G08G 1/165* (2013.01); *G08G 1/166* (2013.01)

(56) References Cited

OTHER PUBLICATIONS

Yuasa et al., "Research into Evaluation Method for Pedestrian Pre-Collision System", Proceedings of the 23rd International Technical Conference on the Enhanced Safety of Vehicles, May 2013, pp. 1-9. (Year: 2013).*

* cited by examiner

FIG.3  NORMAL CASE

OBJECT DETECTION APPARATUS

CROSS-REFERENCE TO RELATED APPLICATIONS

This application is based on and claims the benefit of priority from earlier Japanese Patent Application No. 2014-193890 filed Sep. 24, 2014, the description of which is incorporated herein by reference.

TECHNICAL FIELD

The present invention relates to an object detection apparatus mounted in a vehicle.

BACKGROUND ART

In recent years, techniques have been developed for detecting an object around a vehicle and preventing the collision or mitigating the impact of any possible collision between the object and the vehicle. In particular, a technique using a radar and a camera to acquire information regarding an object detected around a vehicle has been proposed (see Patent Literature 1).

More specifically, the technique disclosed in Patent Literature 1 uses a millimeter-wave radar and a monocular camera separately, and if a positional relationship between an object detected by the millimeter-wave radar and an object detected by the monocular camera meets a predetermined criteria, determines that these objects are the same object.

CITATION LIST

Patent Literature

[Patent Literature 1] JP-A-2014-122873

SUMMARY OF THE INVENTION

Technical Problem

In the technique disclosed in Patent Literature 1, however, an error in the position of the object detected using the radar and camera may be generated depending on a way to determine the position of the object. A larger error is more likely to affect the operation of a collision mitigation apparatus. Thus, there is a need to more accurately determine the position of the object.

In consideration of the foregoing, exemplary embodiments of the present invention are directed to providing an object detection apparatus mounted in a vehicle, capable of accurately determining a position of an object.

Solution to Problem

In accordance with an exemplary embodiment of the present invention, there is provided an object detection apparatus. In the apparatus, a sameness determination unit is configured to determine whether or not a first object and a second object are a same object. The first object is an object detected by an electromagnetic wave sensor configured to transmit and receive electromagnetic waves to detect a position of the object. The second object is detected by an image sensor configured to image process a captured image to detect a position of the object. A position determination unit is configured to determine a position of a same object, that is, an object for which the first object and the second object are determined to be the same. A Y-coordinate of or a distance to the same object is determined employing a result of the detection of the first object, and an X-coordinate or an azimuth of the same object with respect to a reference direction in the XY-plane is determined employing a result of the detection of the second object. The XY-plane is defined such that an X-axis direction of the XY-plane is a vehicle widthwise direction and a Y-axis direction of the XY-plane is a vehicle lengthwise direction.

In the present invention, to determine the position of the same object, the distance to (or the Y-coordinate of) the same object is determined employing a result of the detection by the electromagnetic wave sensor having relatively high accuracy in determining the distance (or the Y-coordinate), and the azimuth (or the X-coordinate) of the same object is determined employing a result of the detection of the image sensor having relatively high accuracy in determining the azimuth (or the X-coordinate). Such a configuration of the collision mitigation apparatus enables accurate detection of the object position.

The above and other objects, features and advantages of the present invention will be readily apparent and understood from the following detailed description of preferred embodiments, taken in connection with the appended drawings.

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(Configuration)

An collision mitigation apparatus 1 in accordance with one embodiment of the present invention is an apparatus mounted in a mobile object, such as a vehicle. A vehicle carrying the collision mitigation apparatus 1 is hereinafter referred to as an own vehicle. The collision mitigation apparatus 1 is configured to detect an object (that is an object, such as a vehicle other than the own vehicle or a pedestrian) using a radar and a camera image, and in cases where the own vehicle is likely to collide with the object, perform control operations, such as braking the own vehicle, to avoid the collision or mitigate the impact of any possible collision between the object and the own vehicle.

In particular, the collision mitigation apparatus 1 of the present embodiment is capable of accurately determining whether or not an object detected by the radar and an object detected by the camera are the same object.

Figures 1A, 1B:
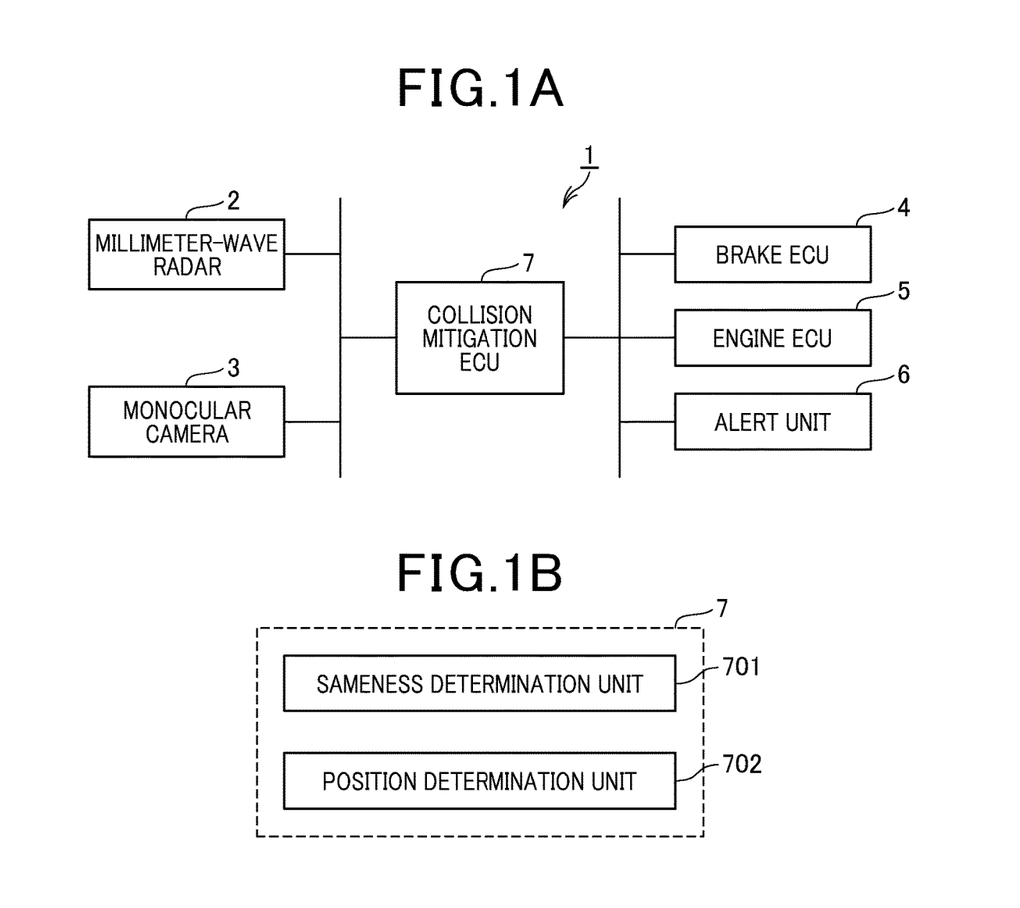
FIG. 1A is a block diagram of a collision mitigation apparatus in accordance with one embodiment of the present invention.
FIG. 1B is a functional block diagram of a collision mitigation ECU.

The collision mitigation apparatus 1, as shown in FIG. 1A, includes a millimeter-wave radar 2, a monocular camera 3, a brake electronic control unit (ECU) 4, an engine ECU 5, an alert unit 6, and a collision mitigation ECU 7. In the collision mitigation apparatus 1, for example, the collision mitigation ECU 7 is communicably connected to the millimeter-wave radar 2, the monocular camera 3, the brake ECU 4, the engine ECU 5, and the alert unit 6. Configurations to implement the communications are not particularly limited.

The millimeter-wave radar 2 is mounted in the front center (leading edge) of the own vehicle to detect objects, such as other vehicles and pedestrians, by using millimeter waves. The millimeter-wave radar 2 transmits millimeter waves forward from the own vehicle while scanning in a horizontal plane and receives millimeter waves reflected back to thereby transmit transmitted and received data in the form of radar signals to the collision mitigation ECU 7.

The monocular camera 3 includes one charge-coupled device (CCD) camera, and is mounted in the front center of an occupant compartment in the own vehicle. The monocular camera 3 transmits data of captured images in the form of image signals to the collision mitigation ECU 7.

The brake ECU 4 includes CPU, ROM, RAM, and others to control braking of the own vehicle. More specifically, the brake ECU 4 controls a brake actuator (brake ACT) in response to a detection value outputted from a sensor to detect a brake pedal depression amount, where the brake actuator serves as an actuator that opens and closes a pressure increasing control valve and a pressure reducing control valve provided in a brake hydraulic circuit. The brake ECU 4 controls the brake actuator following instructions from the collision mitigation ECU 7 so as to increase a braking force of the own vehicle.

The engine ECU 5 includes CPU, ROM, RAM, and others to control engine start/shutdown, a fuel injection amount, the ignition time, and others. More specifically, the engine ECU 5 controls a throttle actuator (throttle ACT) in response to a detection value outputted from a sensor to detect an accelerator pedal depression amount, where the throttle actuator serves as an actuator that opens and closes a throttle valve provided in an air intake conduit. The engine ECU 5 controls the throttle actuator following instructions from the collision mitigation ECU 7 so as to decrease a driving force of the internal-combustion engine.

The alert unit 6, upon reception of a warning signal from the collision mitigation ECU 7, acoustically and optically alerts a driver of the own vehicle.

The collision mitigation ECU 7 includes CPU, ROM, RAM, and others to integrally control the collision mitigation apparatus 1. The collision mitigation ECU 7 acquires radar signals from the millimeter-wave radar 2 and image signals from the monocular camera 3 every predetermined time interval based on a master clock of the CPU.

(Processing)

Figure 2:
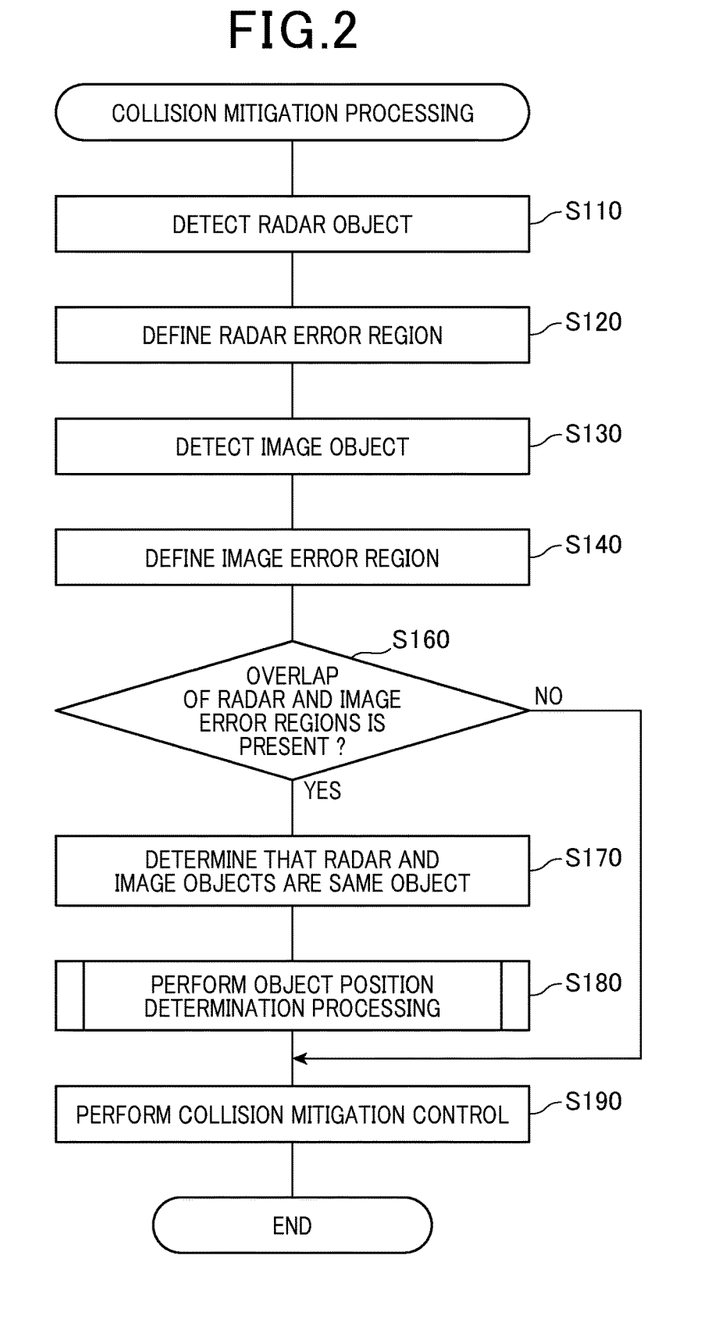
FIG. 2 is a flowchart of collision mitigation processing to be performed in the collision mitigation ECU.

There will now be described object detection and collision mitigation processing to be performed in the collision mitigation apparatus 1. An object detection program, i.e., a program for the collision mitigation apparatus 1 to implement the object detection and collision mitigation processing, is stored in the collision mitigation ECU 7. This processing to be performed in the collision mitigation ECU 7 will be described with reference to FIG. 2. FIG. 2 illustrates a flowchart of the object detection and collision mitigation processing to be performed in the collision mitigation ECU 7 every predetermined time interval.

First, in the collision mitigation processing, as shown in FIG. 2, the collision mitigation ECU 7 detects an object based on a radar signal transmitted from the millimeter-wave radar 2 (i.e., detection information from the millimeter-wave radar 2) (step S110). More specifically, based on one or more radar signals, the collision mitigation ECU 7 identifies an object and calculates (or determines) a linear distance from the own vehicle to the object and a horizontal azimuth angle of the object (i.e., an angular position of the object from the direction ahead of the own vehicle).

Figure 3:
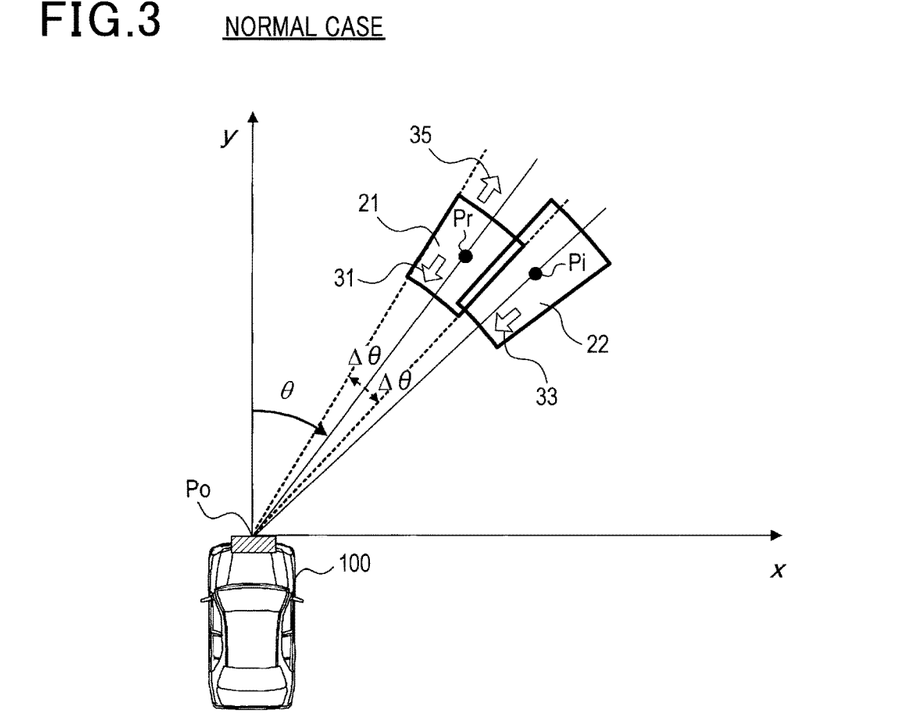
FIG. 3 is a plan view of error regions.

Based on these calculated values, the collision mitigation ECU 7, as shown in FIG. 3, calculates or determines position coordinates (X- and Y-coordinates) of the object in the XY-plane as a detection point Pr of the object in the XY-plane. The X-axis of the XY-plane represents a vehicle-widthwise direction (lateral direction) of the own vehicle, and the Y-axis of the XY-plane represents a vehicle-lengthwise direction of the own vehicle (i.e., the direction ahead of the own vehicle). The detection point Pr of an object having a plurality of detection points detected by the millimeter-wave radar 2 in an object-widthwise direction is set in the middle of the plurality of detection points.

A reference point Po of the XY-plane is set at a nose (or front end) of the own vehicle, on which the millimeter-wave radar 2 is mounted. The detection point Pr is a relative position of the object with respect to the reference point Po. FIG. 3 illustrates an example of an object located ahead of and to the right of the own vehicle. Additionally, in step S110, the collision mitigation ECU 7 may calculate, in addition to the detection point Pr of the object, a relative speed and the like of the object with respect to the own vehicle. In the following, the object detected in step S110 (information about the object detected based on the detection information from the millimeter-wave radar 2) will be referred to as a "radar object."

Subsequently, as shown in FIG. 3, the collision mitigation ECU 7 defines a radar error region 21 centered at the detection point Pr calculated in step S110 (step S120). More specifically, the radar error region 21 has a two-dimensional extension (specified by $\Delta\theta$) centered at the detection point Pr, where an extension of the radar error region 21 in the X-axis direction represents a range of assumed error around the X-coordinate of the detection point Pr and an extension of the radar error region 21 in the Y-axis direction represents a range of assumed error around the Y-coordinate of the detection point Pr. These ranges of assumed error are predetermined based on the characteristics of the millimeter-wave radar 2.

Subsequently, the collision mitigation ECU 7 detects an object based on an image signal transmitted from the monocular camera 3 (i.e., a captured image from the monocular camera 3) (step S130). More specifically, the collision mitigation ECU 7 applies image analysis to the captured image represented by the image signal to identify an object. This identification may be implemented by matching processing using prestored object models.

An object model is prepared for each object type, such as a vehicle, a pedestrian, or the like, which allows not only determination of the presence of an object, but also identification of its object type. The collision mitigation ECU 7 determines a Y-coordinate of the object in the XY-plane based on a vertical position of the object in the captured image, and a horizontal azimuth angle of the object (an angular position from the direction ahead of the own vehicle) based on a horizontal position of the object in the capture image.

As the object is located more distant from the own vehicle in the direction ahead of the own vehicle, that is, as the Y-coordinate of the object is increased, a lower end of the object tends to be located at a higher position in the captured image. This allows the Y-coordinate of the object to be determined based on the lower end position of the object in the captured image. In such a specific manner, however, inaccurate detection of the lower end position of the object will leads to lower accuracy in detecting the Y-coordinate of the object.

In addition, a horizontal displacement of the object from the focus of expansion (FOE) of the monocular camera 3 tends to increase with an increasing angular displacement (inclination) of the object from the direction ahead of the own vehicle (specifically, a line of X=0). This allows a horizontal azimuth angle of the object to be determined based on a distance from the FOE to a vertical line passing through the center of the object.

As such, in step S130, the collision mitigation ECU 7 determines the Y-coordinate and the horizontal azimuth angle (angular position) of the object in the XY-plane as the detection point Pi of the object in the XY-plane, as shown in FIG. 3. The detection point Pi of the object is set, for example, in the center in the object's width direction. The detection point Pi of the object represents a relative position of the object with respect to the reference point Po. In the following, the object detected in step S130 (the object detected based on the captured image from the monocular camera 3) will be referred to as an "image object."

Subsequently, as shown in FIG. 3, the collision mitigation ECU 7 defines an image error region 22 centered at the detection point Pi calculated in step S130 (step S140). More specifically, the image error region 22 has a two-dimensional extension centered at the detection point Pi, where an extension of the image error region 22 in the Y-axis direction represents a range of assumed error around the Y-coordinate of the detection point Pi and an extension of the image error region 22 in the horizontal azimuth angle direction represents a range of assumed error around the horizontal azimuth angle of the detection point Pi. These ranges of assumed error are predetermined based on the characteristics of the monocular camera 3.

Subsequently, the collision mitigation ECU 7 determines whether or not there is an overlap of the radar error region 21 and the image error region 22 in the XY-plane (step S160).

If in step S160 it is determined that there is an overlap of the radar error region 21 and the image error region 22 (step S160; YES), then the collision mitigation ECU 7 determines that the radar object and the image object are the same object (step S170). Subsequently, object position determination processing is performed (step S180). In the object position determination processing, the position of the object is determined or identified using the position of the radar object and the position of the image object.

Figure 4:
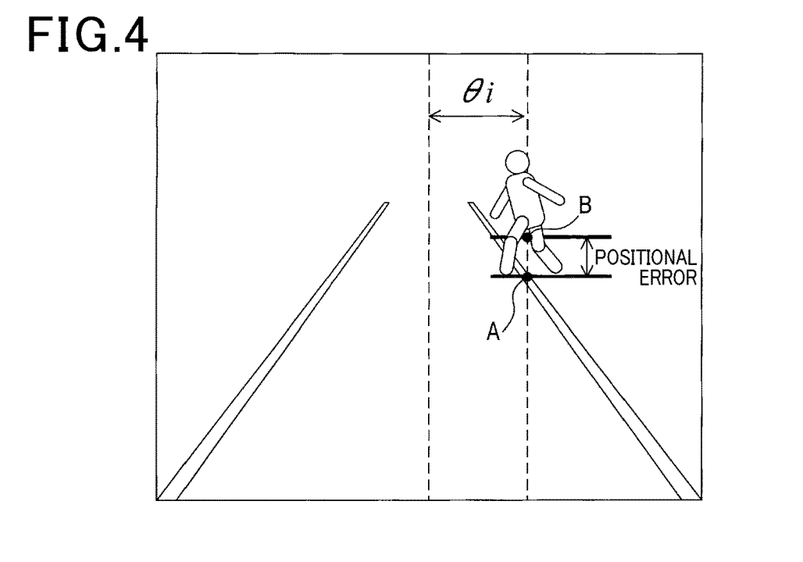
FIG. 4 is an example of an error in an object position in a captured image.

In general, the accuracy in detecting an azimuth of an object by image processing of a captured image acquired from the monocular camera 3 is likely to be higher than the accuracy in detecting an azimuth of the object by the millimeter-wave radar 2. Meanwhile, the accuracy in detecting a distance to the object by image processing of the captured image acquired from the monocular camera 3 is likely to be lower than the accuracy in detecting a distance to the object by the millimeter-wave radar 2. For example, as shown in FIG. 4, positions of upper and lower body parts of a pedestrian may be used to determine an azimuth of the pedestrian from a captured image. Thus, the azimuth $\theta i$ of the pedestrian with respect to the front of the vehicle can be relatively accurately determined.

Figure 5:
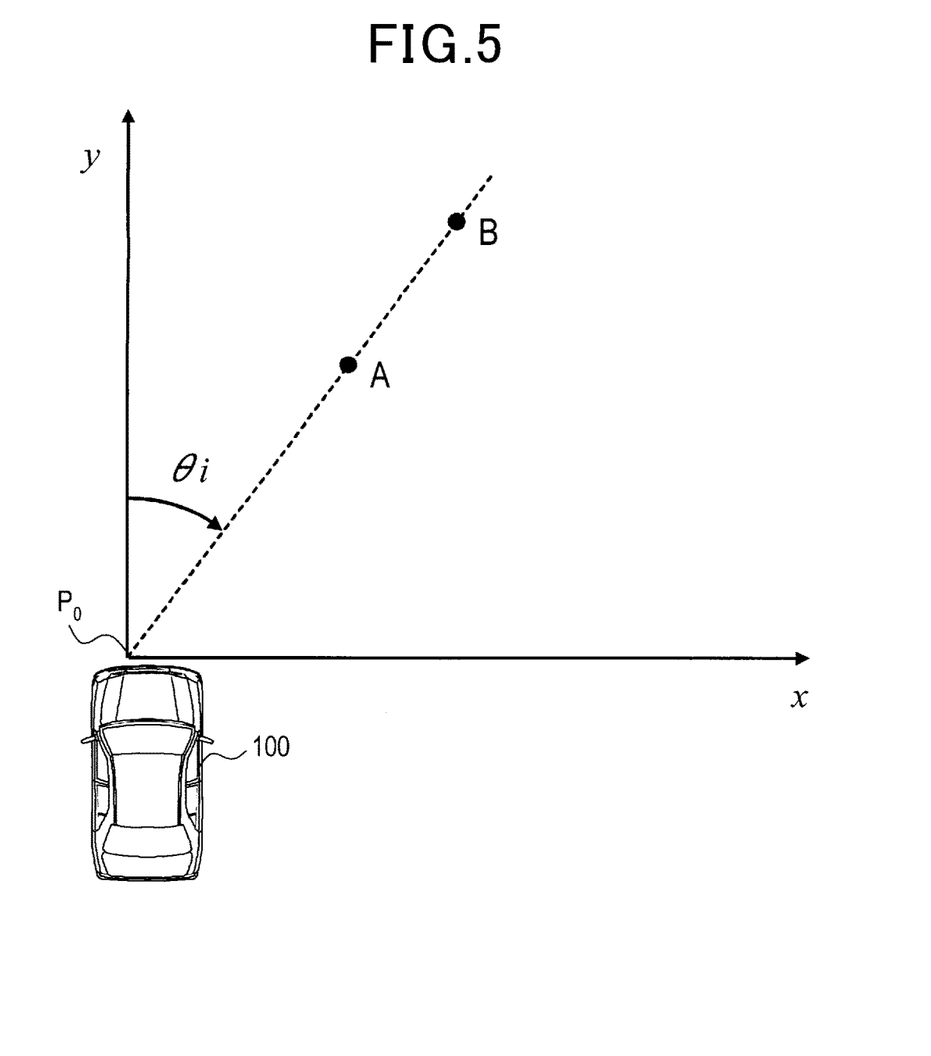
FIG. 5 is a plan view illustrating a position error in an XY-plane of a captured image.

To determine a distance to the pedestrian from the captured image, it is necessary to accurately determine a position of feet of the pedestrian. However, the feet of the pedestrian frequently move and are thinner than a body of the pedestrian, which may cause errors in the position of the feet of the pedestrian. Particularly, in the event where a clothing or shoe color merges with a color of a roadway, the position of the feet of the pedestrian is open to error. In the example of FIG. 4, FIG. 5 illustrates a positional relationship between a position A that is an actual position of the feet of the pedestrian and a position B that is mistakenly recognized as the actual position of the feet of the pedestrian, where the positions A and B are situated in the azimuth $\theta i$ of the pedestrian.

In such a case, the X-coordinates of the respective positions A and B are also susceptible to error. It should, therefore, be noted that, in the case where the position of the object is merely determined by the azimuth of the object acquired from the captured image, braking or the like to be performed in response to the X-coordinate of the object is prone to malfunction. Therefore, in the object position determination processing, the object position is determined such that braking control is less prone to malfunction.

Figure 6:
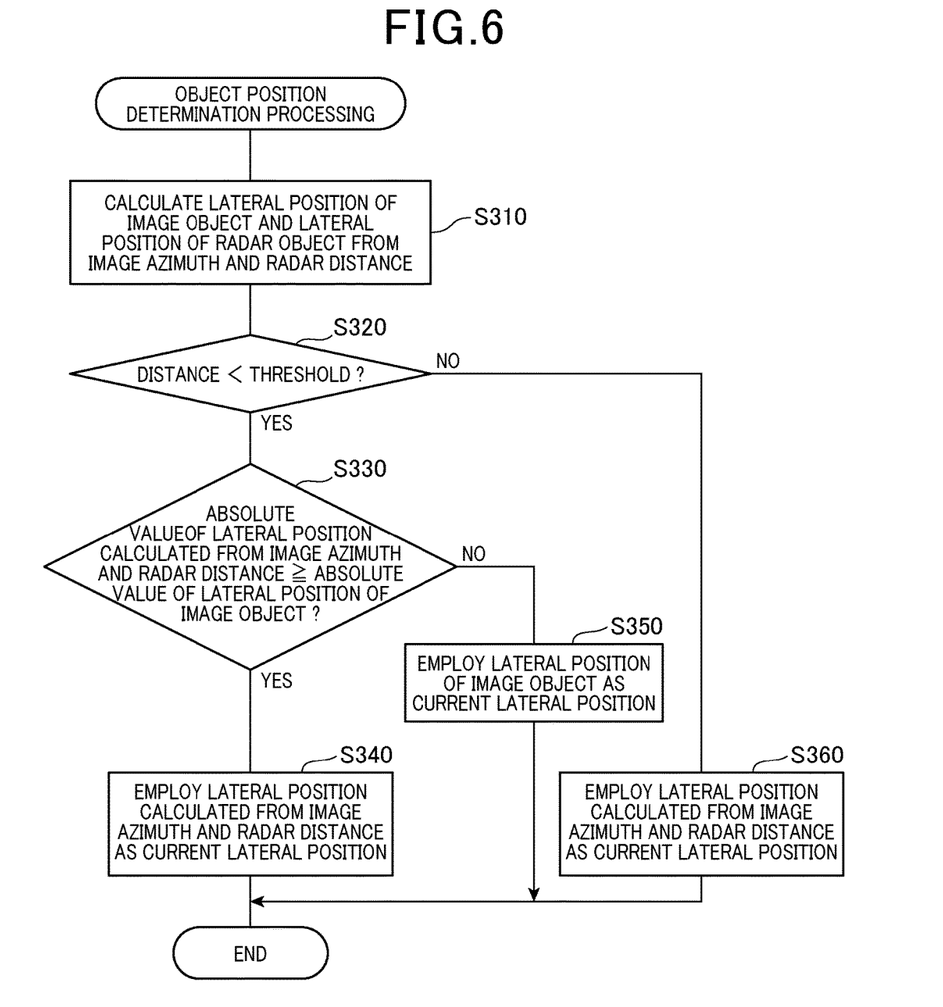
FIG. 6 is a flowchart of object position determination processing included in the collision mitigation processing.

More specifically, as shown in FIG. 6, the collision mitigation ECU 7 determines a lateral position (X-coordinate) of the image object and a lateral position (X-coordinate) of the radar object from the image azimuth (that is the azimuth of the image object) and the radar distance (that is the distance to the radar object), respectively (step S310). In this step, the lateral position of the image object and the lateral position of the radar object are determined from the acquired coordinates of the image object and the acquired coordinates of the radar object, respectively.

Subsequently, the collision mitigation ECU 7 compares the distance to the radar object with a predetermined threshold (step S320). In this step, the distance to the radar object is utilized in the present embodiment because the accuracy of the distance to the radar object is higher than the accuracy of the distance to the image object.

Figure 7:
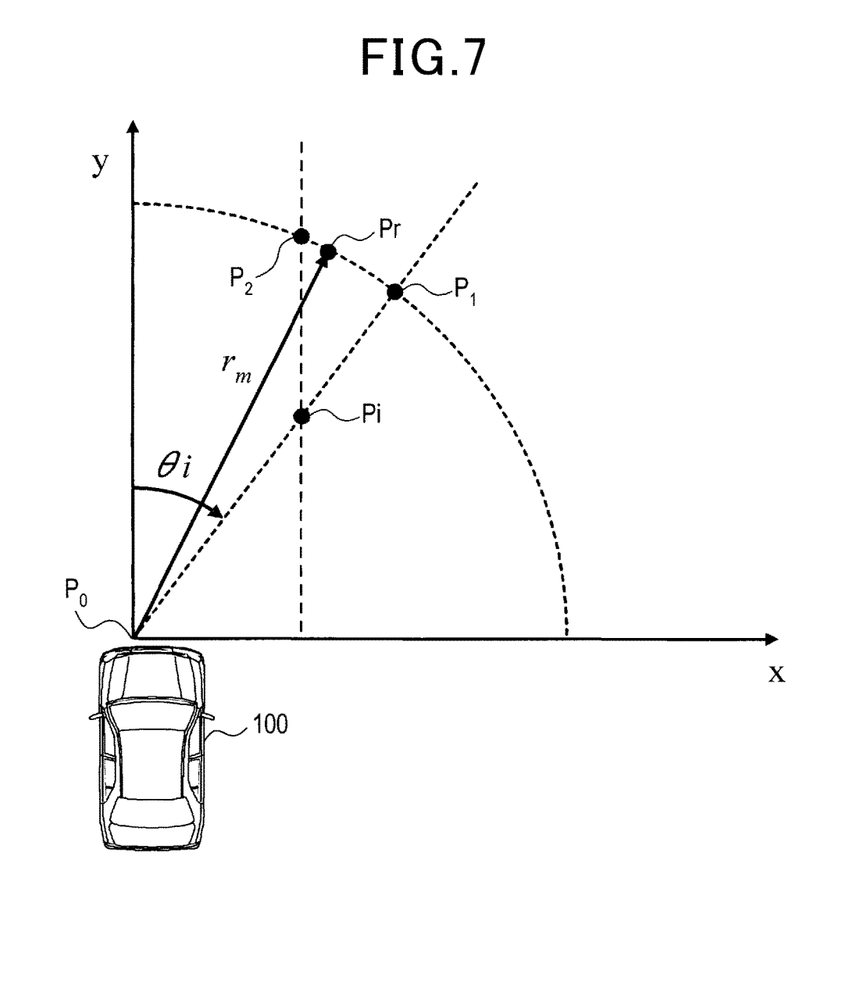
FIG. 7 is a plan view of a position of an object in accordance with the embodiment.

If the distance to the radar object is equal to greater than the threshold (step S320; NO), the collision mitigation ECU 7 employs a lateral position acquired from the image azimuth and the radar distance as a current lateral position (step S360). That is, as shown in FIG. 7, given the distance (rm) to the radar object Pr, the position of the object is set to a point P1 that is situated on a circular arc of the radius rm and in the image azimuth $\theta i$. Thereafter, the object position determination processing ends.

If the distance to the radar object is less than the threshold (step S320; YES), the collision mitigation ECU 7 compares an absolute value of the lateral position (P1) acquired from the image azimuth and the radar distance and an absolute value of the lateral position (P2) acquired only from the image (i.e., the lateral position of the image object) (step S330).

In the example of FIG. 7, the image object (Pi) is closer to the own vehicle than the radar object (Pr). Thus, the X-coordinate of P1 is greater than the X-coordinate of P2. In the case where the radar object (Pr) is closer to the own vehicle than the image object (Pi), the X-coordinate of P2 may be greater than the X-coordinate of P1.

If the absolute value of the X-coordinate of P1 is equal to or greater than the absolute value of the lateral position of P2 (step S330; YES), the collision mitigation ECU 7 employs the lateral position acquired from the image azimuth and the radar distance, that is, the X-coordinate of P1 as the lateral position of the object (step S340). If the absolute value of the X-coordinate of P1 is less than the absolute value of the lateral position of P2 (step S330; NO), the collision mitigation ECU 7 employs the X-coordinate of the lateral position (P2) acquired only from the image object as the lateral position of the object (step S350).

The coordinates of P2 shown in FIG. 7 are given by the distance rm from P0 to P2 and the X-coordinate of the image object. In steps S340, S350, the collision mitigation ECU 7 employs a larger one of the absolute value of the X-coordinate of P1 and the absolute value of the X-coordinate of P2 to perform the collision mitigation processing. Thereafter, the object position determination processing ends.

In FIG. 2, if it is determined in step S160 that there exists no overlap of the radar error region 21 and the image error region 22 (step S160; NO), then the collision mitigation ECU 7 determines that the radar object and the image object are not the same, that is, they are different objects. Then, the process flow proceeds to step S190.

Subsequently, the collision mitigation ECU 7 performs collision mitigation control based on the position of the detected object (step S190). For example, if the own vehicle is likely to collide with the object, the collision mitigation ECU 7 transmits a warning signal to an alert unit 6 to alert the driver. If the own vehicle is more likely to collide with the object, the collision mitigation ECU 7 instructs the engine ECU 5 to decrease a driving force of an internal-combustion engine and/or instructs the brake ECU 4 to increase a braking force of the own vehicle.

In addition, the collision mitigation ECU 7 changes control aspects depending on the degree of confidence. For example, for a high degree of confidence, a control initiation timing is advanced as compared to a control initiation timing for a low degree of confidence.

In the present embodiment, the collision mitigation ECU 7 corresponds to an object detection apparatus of the present invention. FIG. 1B illustrates a functional block diagram of the collision mitigation ECU 7. Various implementations of these blocks described herein can be realized in processor, in software, or in any combination thereof. The collision mitigation ECU 7 includes, as functional blocks, includes a sameness determination unit 701 and a position determination unit 702. The sameness determination unit 701 performs step S160, and the position determination unit 702 performs step S180.

Advantages

In the collision mitigation apparatus 1 described as above, the collision mitigation ECU 7 determines whether or not a first object and a second object are the same object, where the first object is an object detected by an electromagnetic wave sensor configured to transmit and receive electromagnetic waves to detect a position of the object and the second object is an object detected by an image sensor configured to image process a captured image to detect a position of the object. To determine the position of the same object that is an object for which the first object and the second object are determined to be the same, the collision mitigation ECU 7 employs a result of the detection of the first object to determine a Y-coordinate of the same object or a distance to the same object in an XY-plane, and employs a result of the detection of the second object to determine an X-coordinate of the same object or an azimuth of the same object with respect to a reference direction in the XY-plane. The XY-plane is defined such that an X-axis direction of the XY-plane is a vehicle widthwise direction and a Y-axis direction of the XY-plane is a vehicle lengthwise direction.

In the collision mitigation apparatus 1, to determine the position of the same object, the distance to the same object (or the Y-coordinate of the position of the same object) in the XY-plane is determined employing a result of the detection by the electromagnetic wave sensor, and the azimuth of the same object with respect to the reference direction (or the X-coordinate of the position of the same object) in the XY-plane is determined employing a result of the detection by the image sensor. The electromagnetic wave sensor has relatively high accuracy in determining the distance to the same object (or the Y-coordinate of the position of the same object) in the XY-plane. The image sensor has relatively high accuracy in determining the azimuth of the same object with respect to the reference direction (or the X-coordinate of the position of the same object) in the XY-plane. Such a configuration of the collision mitigation apparatus enables accurate detection of the object position.

In the collision mitigation apparatus 1, the collision mitigation ECU 7 determines whether to employ the X-coordinate or the azimuth of the same object, depending on the distance to first object. Such a configuration of the collision mitigation apparatus 1 enables accurate detection of the position of the same object.

In the collision mitigation apparatus 1, if the distance to the first object is equal to or greater than a predetermined threshold, the collision mitigation ECU 7 uses the azimuth of the second object to determine the position of the same object.

In the case where the position of the same object is determined using the azimuth of the second object, the azimuth of the same object (corresponding to a ratio of the X-coordinate to the Y-coordinate of the second object) can be determined accurately while the lateral position (X-coordinate) of the same object may be subject to large errors. However, in such a case where the object is relatively far from the own vehicle, the collision mitigation apparatus 1 is less likely to malfunction in braking or the like.

Such a configuration of the collision mitigation apparatus 1 enables accurate detection of the azimuth of the object while preventing incorrect braking or the like.

In the collision mitigation apparatus 1, if the distance to first object is less than the predetermined threshold, the collision mitigation ECU 7 employs a larger one of the absolute value of the X-coordinate of the second object and the absolute value of the X-coordinate of the same object determined using the X-coordinate of the first object or the distance to the first object and the azimuth of the second object, as the X-coordinate of the same object.

Such a configuration of the collision mitigation apparatus 1, where a larger one of the absolute value of the X-coordinate of the second object and the absolute value of the X-coordinate of the same object determined using the azimuth of the second object is employed as the X-coordinate of the same object, can reduce the possibility of incorrect braking or the like.

Other Embodiments

The present invention is not in any way limited to the above embodiment. Reference numerals and signs used in the above description of the embodiment are appropriately used in the claims as well. The reference numerals and signs are used for easy understanding of the present invention, and should not be construed as limiting the technical scope of the present invention. The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

It should be appreciated that the invention is not to be limited to the collision mitigation apparatus 1 disclosed above and that the present invention can be implemented in numerous ways, including as a system that includes the collision mitigation apparatus 1 as a component, a program for enabling a computer to function as the collision mitigation apparatus 1, a storage medium storing such a program, a collision mitigation method and the like.

Figure 8:
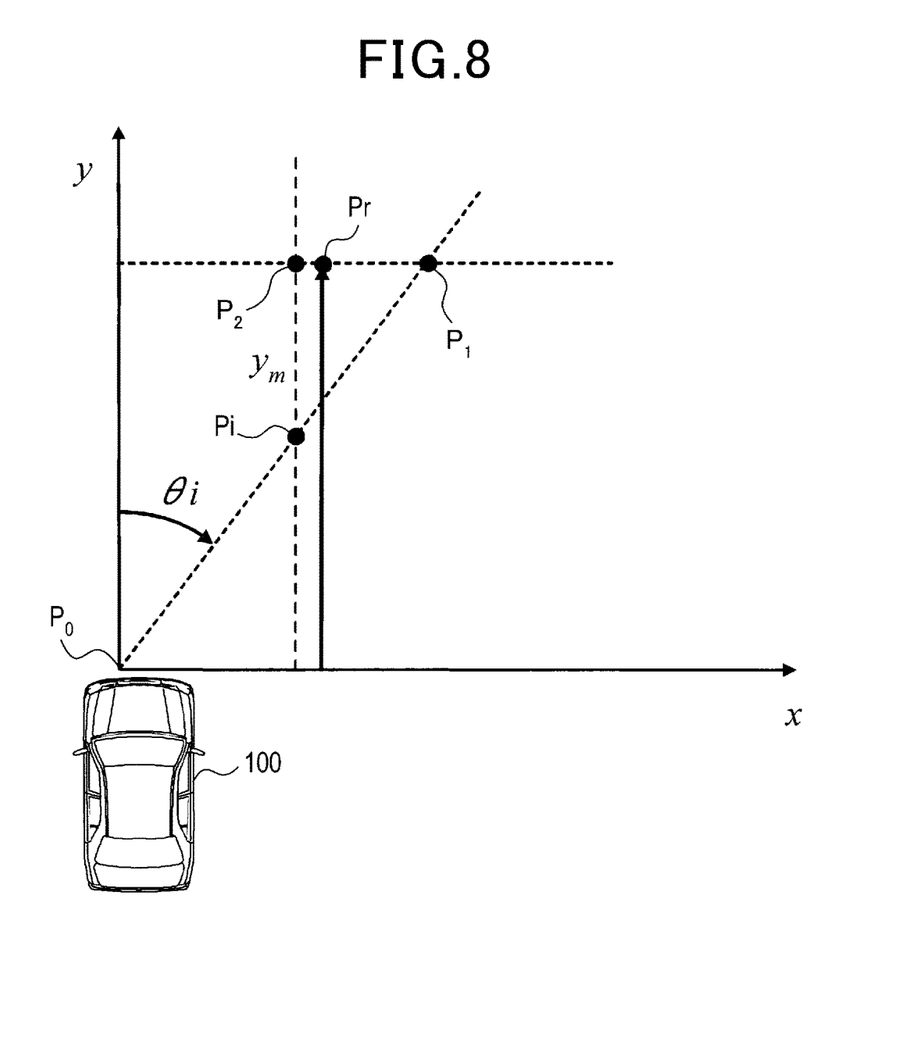
FIG. 8 is a plan view of a position of an object in accordance with a modification.

Particularly, in the above embodiment, the distance to the radar object is used to determine the position of the object. Alternatively, as shown in FIG. 8, the Y-coordinate of the radar object, in lieu of the distance to the radar object, may be used to determine the position of the object. As in the above embodiment, the positions of P1 and P2 shown in FIG. 7 are changed to the positions of P1 and P2 as shown in FIG. 8.

Such an alternative embodiment can provide similar advantages to those of the embodiment described as above.

In the collision mitigation apparatus 1, for example, regardless of the distance to the object, the collision mitigation ECU 7 uses a larger one of the absolute value of the X-coordinate of the second object and the absolute value of the X-coordinate of the same object determined using the X-coordinate of or the distance to the first object and the azimuth of the second object, as the X-coordinate of the same object. That is, step S330 may be performed with step S320 removed.

Such a configuration of the collision mitigation apparatus 1, where a larger one of the absolute value of the X-coordinate of the second object and the absolute value of the X-coordinate of the same object determined using the azimuth of the second object is used as the X-coordinate of the same object can reduce the possibility of incorrect braking or the like.

The invention claimed is:

1. An object detection apparatus mounted in a vehicle, comprising:
a sameness determination unit configured to determine, using a processor, whether or not a first object and a second object are a same object, the first object being an object detected by an electromagnetic wave sensor configured to transmit and receive electromagnetic waves to detect a position of the object, the second object being an object detected by an image sensor configured to image process a captured image to detect a position of the object;
a position determination unit configured to determine, using the processor, a position of the same object that is an object for which the first object and the second object are determined to be the same, a Y-coordinate of the same object or a distance to the same object in an XY-plane being determined by employing a result of the detection of the first object, an X-coordinate of the same object or an azimuth of the same object with respect to a reference direction in the XY-plane being determined by employing a result of the detection of the second object, the XY-plane being defined such that an X-axis direction of the XY-plane is a vehicle widthwise direction and a Y-axis direction of the XY-plane is a vehicle lengthwise direction, the position determination unit being further configured to determine whether to employ the X-coordinate or the azimuth of the same object, according to a predefined condition, and
the position determination unit is configured to determine whether to employ the X-coordinate or the azimuth of the same object, depending on a distance to the first object.

2. The apparatus according to claim 1, wherein the position determination unit is configured to, if the distance to the first object is equal to or greater than a predetermined threshold, use the azimuth of the second object to determine the position of the same object.

3. The apparatus according to claim 2, wherein the position determination unit is configured to, if the distance to the first object is less than the predetermined threshold, employ a larger one of an absolute value of an X-coordinate of the second object and an absolute value of an X-coordinate of the same object determined using an X-coordinate of the first object or the distance to the first object and the azimuth of the second object, as the X-coordinate of the same object.

4. The apparatus according to claim 3, wherein the position determination unit is configured to employ a larger one of an absolute value of an X-coordinate of the second object and an absolute value of an X-coordinate of the same object determined using an X-coordinate of the first object or the distance to the first object and the azimuth of the second object, as the X-coordinate of the same object.

5. A method for performing object detection utilizing an electromagnetic wave sensor and an image sensor, which are both mounted on a vehicle, the electromagnetic wave sensor configured to transmit and receive electromagnetic waves to detect object position, the image sensor configured to image process a captured image to also detect object position, the method comprising:
determining whether or not a first object and a second object are a same object, the first object being an object detected by the electromagnetic wave sensor, the second object being an object detected by the image sensor;
determining a position of the same object that is an object for which the first object and the second object are determined to be the same, wherein a Y-coordinate of the same object or a distance to the same object in an XY-plane being determined by employing a result of the detection of the first object, and an X-coordinate of the same object or an azimuth of the same object with respect to a reference direction in the XY-plane being determined by employing a result of the detection of the second object, wherein the XY-plane being defined such that an X-axis direction of the XY-plane is a vehicle widthwise direction and a Y-axis direction of the XY-plane is a vehicle lengthwise direction;

determining whether to employ the X-coordinate or the azimuth of the same object, according to a predefined condition; and determining whether to employ the X-coordinate or the azimuth of the same object, depending on a distance to the first object.

6. A system for performing object detection utilizing an electromagnetic wave sensor and an image sensor, which are both mounted on a vehicle, the electromagnetic wave sensor configured to transmit and receive electromagnetic waves to detect object position, the image sensor configured to image process a captured image to also detect object position, the system comprising:

a central processor;

a non-transitory computer-readable storage medium; and a set of computer-executable instructions stored on the computer-readable storage medium that cause the central processor to implement:

determining whether or not a first object and a second object are a same object, the first object being an object detected by the electromagnetic wave sensor, the second object being an object detected by the image sensor;

determining a position of the same object that is an object for which the first object and the second object are determined to be the same, wherein a Y-coordinate of the same object or a distance to the same object in an XY-plane being determined by employing a result of the detection of the first object, and an X-coordinate of the same object or an azimuth of the same object with respect to a reference direction in the XY-plane being determined by employing a result of the detection of the second object, wherein the XY-plane being defined such that an X-axis direction of the XY-plane is a vehicle widthwise direction and a Y-axis direction of the XY-plane is a vehicle lengthwise direction;

determining whether to employ the X-coordinate or the azimuth of the same object, according to a predefined condition; and determining whether to employ the X-coordinate or the azimuth of the same object, depending on a distance to the first object.

\* \* \* \* \*